(12) United States Patent
Alperovich et al.

(10) Patent No.: US 6,400,944 B1
(45) Date of Patent: *Jun. 4, 2002

(54) SYSTEM AND METHOD FOR HANDLING INCOMING CALLS TO AN OPTIMIZED MOBILE STATION WITHIN A SATELLITE NETWORK

(75) Inventors: Vladimir Alperovich, Dallas; Eric Valentine, Plano, both of TX (US)

(73) Assignee: Ericsson Inc., Research Trinagle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/219,183

(22) Filed: Dec. 22, 1998

(51) Int. Cl.⁷ .................................................. H04Q 7/20
(52) U.S. Cl. ........................ 455/428; 455/433; 455/445
(58) Field of Search ................................ 455/428, 433, 455/414, 421, 432, 435, 436, 437, 438, 439, 445, 461, 412, 413, 422, 458, 417, 12.1, 406

(56) References Cited

U.S. PATENT DOCUMENTS 6,067,452 A * 3/2000 Alexander .................. 455/428
6,064,882 A * 5/2000 Coyne et al. ............... 455/428

\* cited by examiner

Primary Examiner—Vivian Chang
Assistant Examiner—J Moore
(74) Attorney, Agent, or Firm—Jenkens & Gilchrist, P.C.

(57) ABSTRACT

A telecommunications system and method is disclosed for preventing sub-optimal routing of new incoming calls to a mobile station (MS) that has been re-registered at a remote optimal Mobile Switching Center/Visitor Location Register (MSC/VLR) for an optimized call. When the MS is re-registered at the remote optimal MSC/VLR, the Home Location Register (HLR) associated with the MS stores an optimization indication indicating that the MS has been re-registered to the optimal MSC/VLR. Thereafter, when an incoming call to the MS is received during the time that the MS is re-registered, the HLR can handle the call based upon the optimization indication. For example, the HLR can forward the incoming call to a local voice mail box associated with the MS.

17 Claims, 9 Drawing Sheets

US 6,400,944 B1

SYSTEM AND METHOD FOR HANDLING INCOMING CALLS TO AN OPTIMIZED MOBILE STATION WITHIN A SATELLITE NETWORK

BACKGROUND OF THE PRESENT INVENTION

FIELD OF THE INVENTION

The present invention relates generally to telecommunications systems and methods for making and receiving calls within a satellite network, and specifically to handling incoming calls to an optimized mobile station within a satellite network.

BACKGROUND AND OBJECTS OF THE PRESENT INVENTION

Cellular telecommunications is one of the fastest growing and most demanding telecommunications applications. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

It should be understood that the aforementioned system 10, illustrated in FIG. 1, is a terrestrially-based system. In addition to the terrestrially-based systems, there are a number of satellite systems, which work together with the terrestrially-based systems to provide cellular telecommunications to a wider network of subscribers. This is due to the fact that the high altitude of the satellite makes the satellite visible (from a radio perspective) from a wider area on the earth. The higher the satellite, the larger the area that the satellite can communicate with.

Within a satellite-based network 205, as shown in FIG. 2 of the drawings, a system of geostationary satellites 200 in orbit (one of which is shown) are used to provide communication between Mobile Stations (MS) 20 and a satellite-adapted Base Station System (SBSS) 220, which is connected to an integrated Mobile Switching Center/Visitor Location Register (MSC/VLR) 240. The MS 20 communicates via one of the satellites 200 using a radio air interface, for instance, based on the Time Division Multiple Access (TDMA) or Code Division Multiple Access (CDMA). The satellite 200 in turn communicates with one or more SBSSs 220, which consist of equipment for communicating with the satellites 200 and through the satellites 200 to the MS's 20. The antennae and satellite tracking part of the system is the Radio Frequency Terminal (RFT) subsystem 230, which also provides for the connection of the communication path to the satellite 200.

In such satellite networks 205 using geostationary satellites 200, the coverage area for a satellite 200 can be (and usually is) very large. This area can be served by a number of MSC/VLRs 240 which are connected to Public Switched Telephone Networks (PSTNs) (wireline networks), PLMNs (cellular networks) and each other. The terrestrial interconnections (trunk circuits) to these MSC/VLRs 240 are expensive to install and maintain, especially in comparison to handling the traffic over the satellite 200. Currently, the terrestrial trunk circuits are leased or owned by the operator, and in some cases, may need to be installed when the satellite network 205 is commissioned. Since the distances within the area served by the satellite(s) 200 are typically very large, the costs for these circuits can be enormous. In particular, the costs can be considerable if the circuits must cross remote areas or oceans.

Thus, as shown in FIG. 3 of the drawings, calls can be optimized using satellite resources by moving a mobile subscribers registration from a serving MSC/VLR 240a to an optimal MSC/VLR 240b. This can be accomplished by sending the Called Party Number (CPN) using, for example, an Unstructured Supplementary Services Data (USSD) string, to a Call Optimization Server (COS) 250 via the serving SBSS 220a and the serving MSC/VLR 240a. The COS 250 performs an analysis on the CPN to determine the optimal MSC/VLR 240b, e.g., the MSC/VLR 240b with either the closest connection to the called subscriber 260 or the MSC/VLR 240b with the least expensive link to the called subscriber 260. Thereafter, the address of the optimal MSC/VLR 240b is returned to the MS 20, which can then register with the indicated MSC/VLR 240b. Once the registration is complete, the MS 20 can send a SETUP message to the new MSC/VLR 240b via the new SBSS 220b, and the call can be completed.

Once the initial call has been optimized, it is handled by the optimal MSC/VLR 240b, which implies that after the initial call has been optimized, all new incoming calls will be routed to that optimal MSC/VLR 240b. However, that optimal MSC/VLR 240b may not be optimal for the new incoming calls. For example, a call that may be a local call prior to the optimization may become a long distance call if the called subscriber is moved (re-registered) to an MSC/VLR 240b that has to be reached via a long distance (most likely international) network.

It is, therefore, an object of the present invention to reduce sub-optimal routing of new incoming calls to a mobile station within a satellite network.

SUMMARY OF THE INVENTION

The present invention is directed to telecommunications systems and methods for reducing sub-optimal routing of new incoming calls to an MS that has been re-registered at an optimal MSC/VLR for an optimized call. When the MS is re-registered at the remote optimal MSC/VLR, the HLR stores an optimization indication indicating that the MS has been re-registered. Thereafter, when an incoming call to the MS is received during the time that the MS is re-registered, the HLR can forward the incoming call to a local voice mail box associated with the MS. Alternatively, the HLR can store an unavailable indication along with the optimization indication while the MS is registered at the optimal MSC/VLR. The unavailable indication instructs the HLR to send an unavailable message to the calling party. In either case, once the MS registers back with the originating MSC/VLR, the MS can be notified that an incoming call was received during the optimized call. Advantageously, either of the above alternatives will avoid setting up a long distance leg to the remote optimal MSC/VLR.

Yet another alternative is to be more selective regarding which calls are to be accepted while the subscriber is re-registered at the optimal MSC/VLR. The HLR can store a screening list containing B-numbers of calling party's that are allowed to proceed even if higher charges are applied. Still a further alternative is to provide a special announcement to the calling party indicating that the MS has been re-registered and that higher charges may apply. The calling party may override the announcement and proceed with the call setup understanding that additional charges may apply to either calling or called party.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
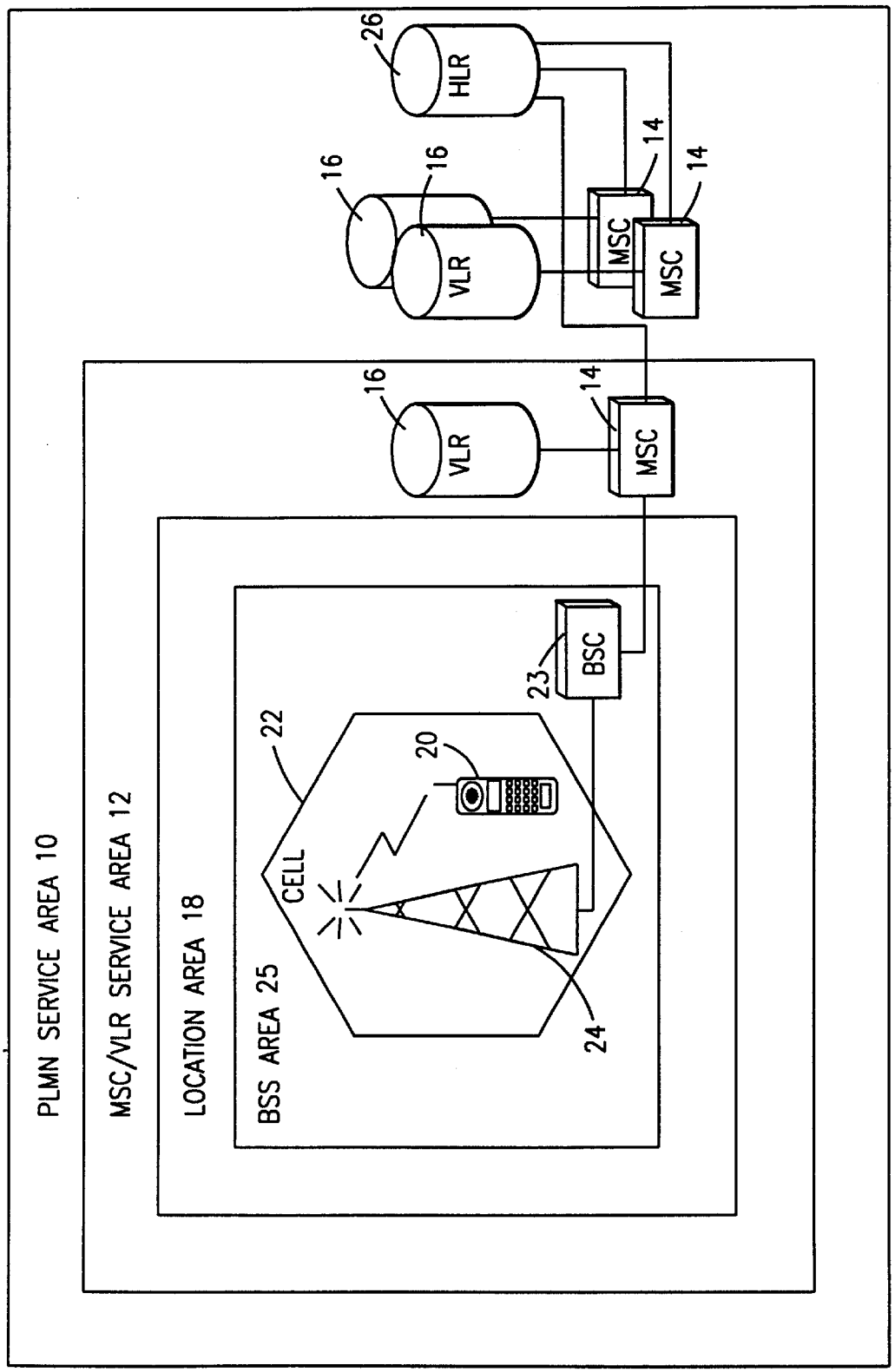
FIG. 1 is a block diagram of a conventional terrestrially-based wireless telecommunications system.
Figure 2:
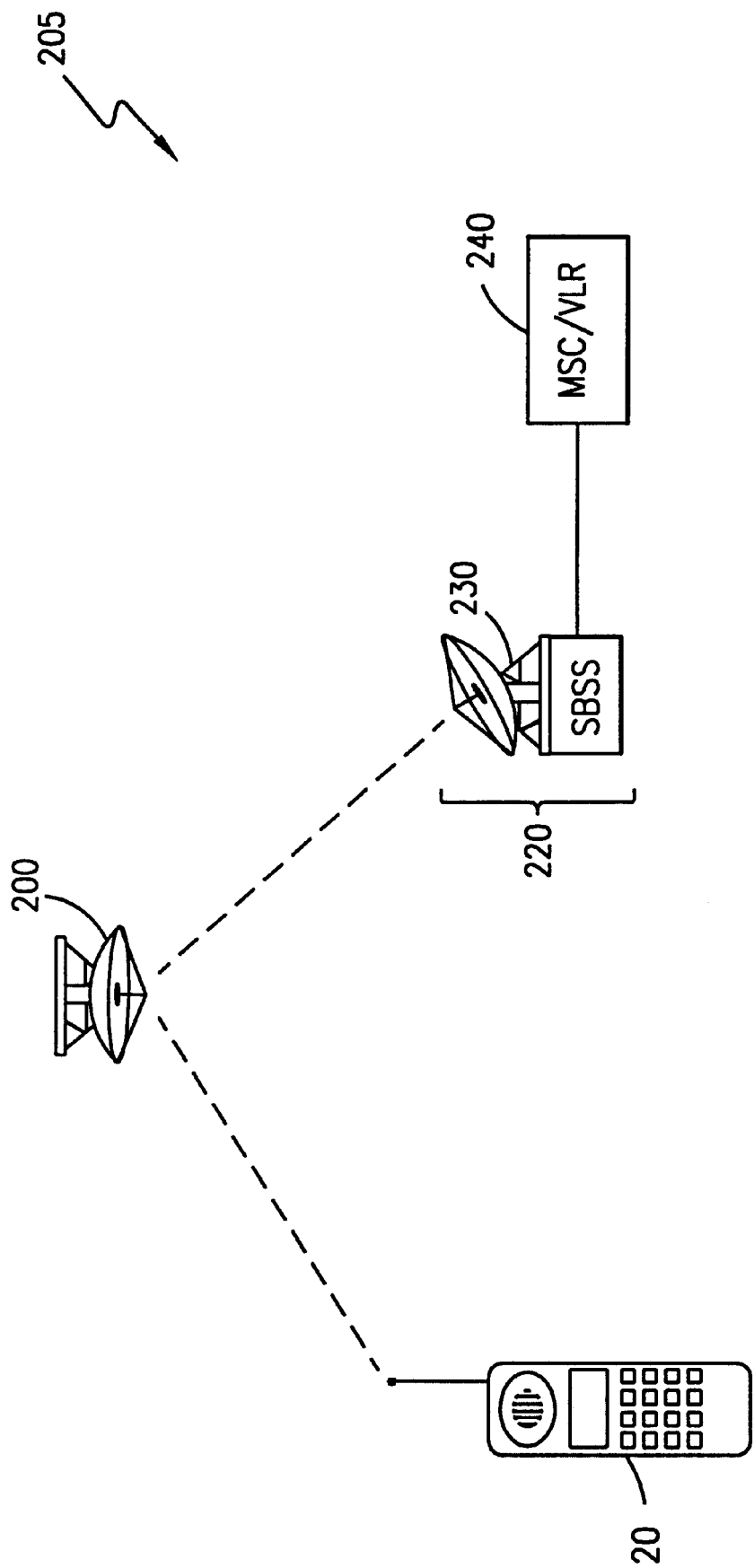
FIG. 2 is a block diagram illustrating aspects of a sample conventional satellite-based telecommunications system.
Figure 3:
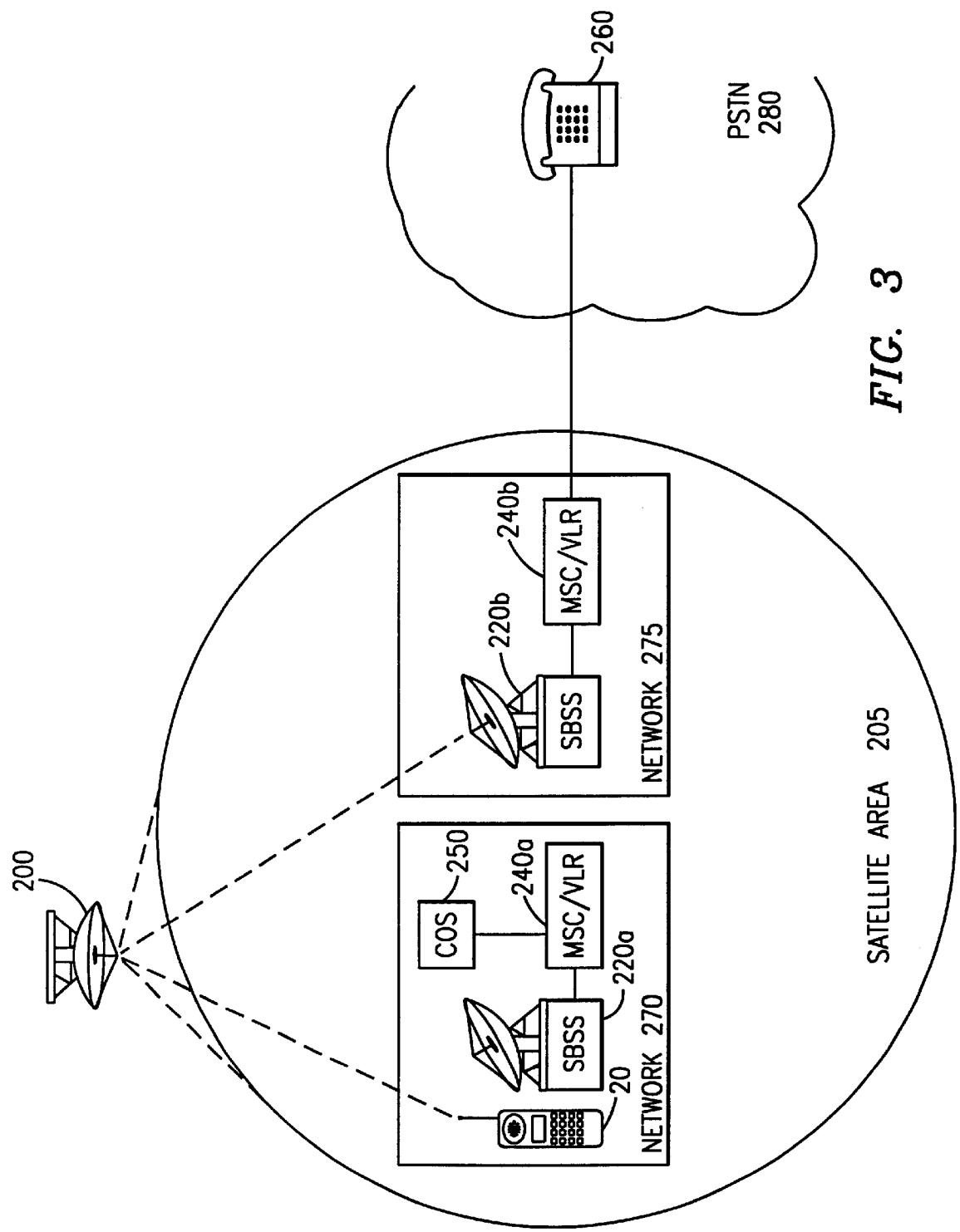
FIG. 3 illustrates the conventional optimization of a call using satellite resources.
Figure 4:
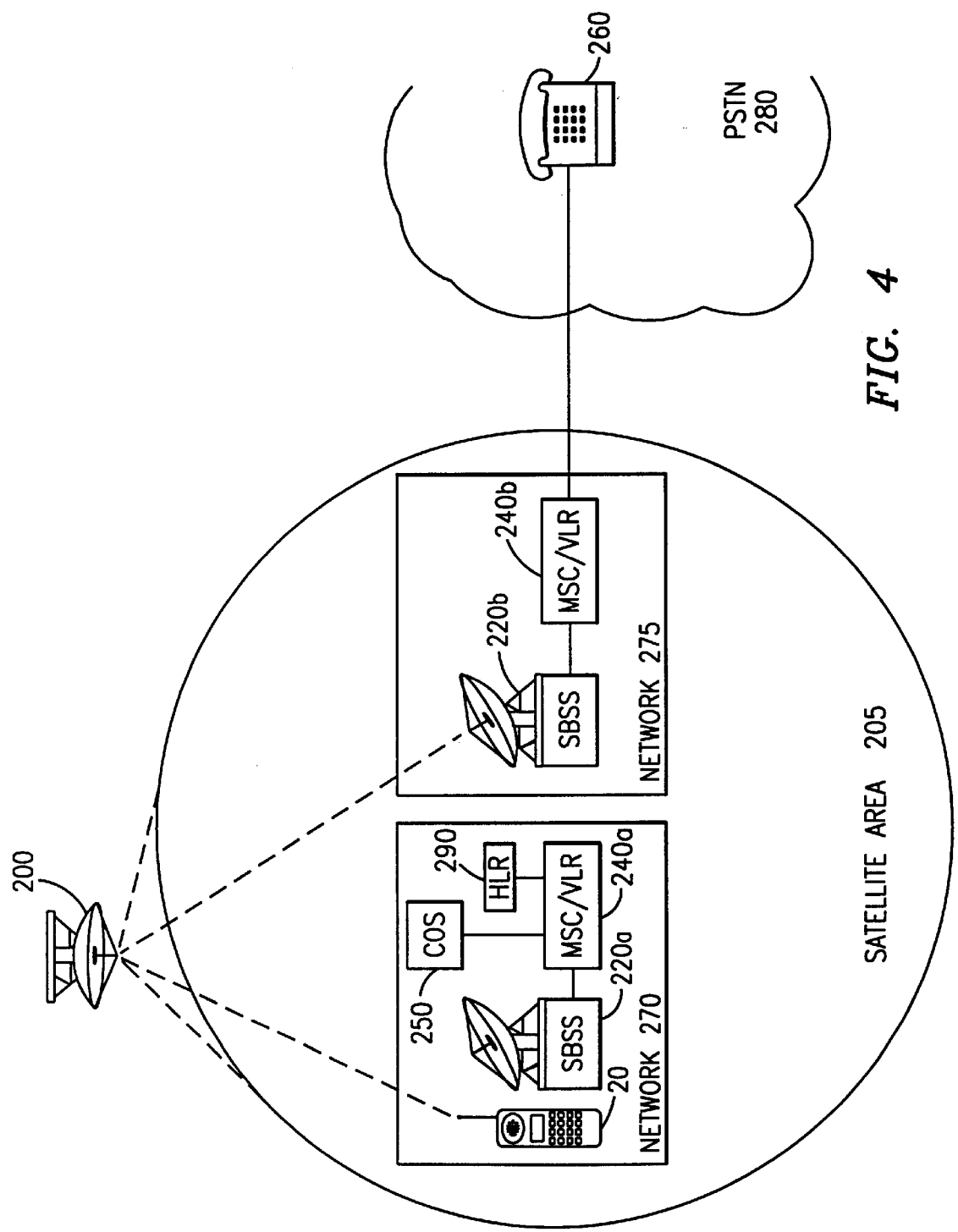
FIG. 4 illustrates the conventional optimization of a call from a mobile station to a fixed subscriber.

A sample optimization process is shown in FIG. 4 of the drawings. Optimization of a call from a Mobile Station (MS) 20 to a called subscriber 260 within the Public Switched Telephone Network (PSTN) 280 (wireline network) can be accomplished by moving the calling MS's 20 registration to an optimal MSC/VLR 240b closest to the PSTN 280 of the called subscriber 260. The MS 20 initiates a call to the called subscriber 260 by inputting a Called Party Number (CPN) associated with the called subscriber 260 and transmitting the CPN in an ACCESS REQUEST message on the Random Access Channel (RACH) to a Mobile Switching Center/Visitor Location Register (MSC/VLR) 240a serving a first network operator 270 via a satellite 200 and a serving Satellite-Adapted Base Station System (SBSS) 220a.

The serving MSC/VLR 240a analyzes the CPN and determines that the CPN is not a number registered within the serving MSC/VLR 240a. Thereafter, the serving MSC/VLR 240a sends the CPN, using, for example, an Unstructured Supplementary Services Data (USSD) string, to a Call Optimization Server (COS) 250 or optimization node, which can be co-located with the serving MSC/VLR 240a. Alternatively, it should be noted that the COS 250 could instead be co-located with a Home Location Register (HLR) 290, within the SBSS 220a or within an external node (not shown), such as a node within the Intelligent Network. The protocol to the external node could be based on an Intelligent Network (IN), Mobile Application Part (MAP) or other protocol.

The COS 250 performs an analysis on the CPN to determine the destination end office (not shown) of the CPN. Thereafter, the COS 250 determines the optimal MSC/VLR 240b, e.g., the MSC/VLR 240b within the area 205 visible to the satellite 200 that has the closest connection to the PSTN 280 or the least expensive link to the PSTN 280, and returns the address for this optimal MSC/VLR 240b to the MS 20 via the satellite 200, the serving MSC/VLR 240a and the serving SBSS 220a. The MS 20 attempts to register with the indicated optimal MSC/VLR 240b serving a second network operator 275 by sending a Location Update request to the optimal MSC/VLR 240b for the purpose of bypassing as much of the terrestrial network as possible. Alternatively, the Location Update request can be sent by the serving SBSS 220a to the optimal MSC/VLR 240b instead of being sent by the calling MS 20. It should be understood that the optimal MSC/VLR 240b could serve another area within the same network 270 as the serving MSC/VLR 240a, instead of being located within another network 275.

The optimization occurs when the MS 20 sends a SETUP message to the new optimal MSC/VLR 240b via the satellite 200 and the new optimal SBSS 220b, as is understood in the art. The call can then be completed normally using minimal terrestrial circuits and existing satellite resources. When the call is finished, the MS 20 is re-registered in the original serving MSC/VLR 240a. This re-registration is necessary for a number of commercial, regulatory and technical reasons.

However, when another new incoming call is placed to the optimized MS 20 during the optimized call, the optimal MSC/VLR 240b for the optimized PSTN call may not be the optimal MSC/VLR for the new incoming call. For example, if the new incoming call is initiated by another MS (not shown) served by the original MSC/VLR 240a, the optimal MSC/VLR 240a for the new incoming call would be the original MSC/VLR 240a. Since the MS 20 has been re-registered to the PSTN optimal MSC/VLR 240b, a long-distance leg must be established to the optimal MSC/VLR 240b to complete the call. This long-distance leg can be expensive for both the calling and called parties. Thus, sub-optimal routing of new incoming calls to the MS 20 after that MS 20 has been re-registered to an optimal MSC/VLR 240b can occur during the time that the MS 20 is registered with that optimal MSC/VLR 240b.

Figure 5:
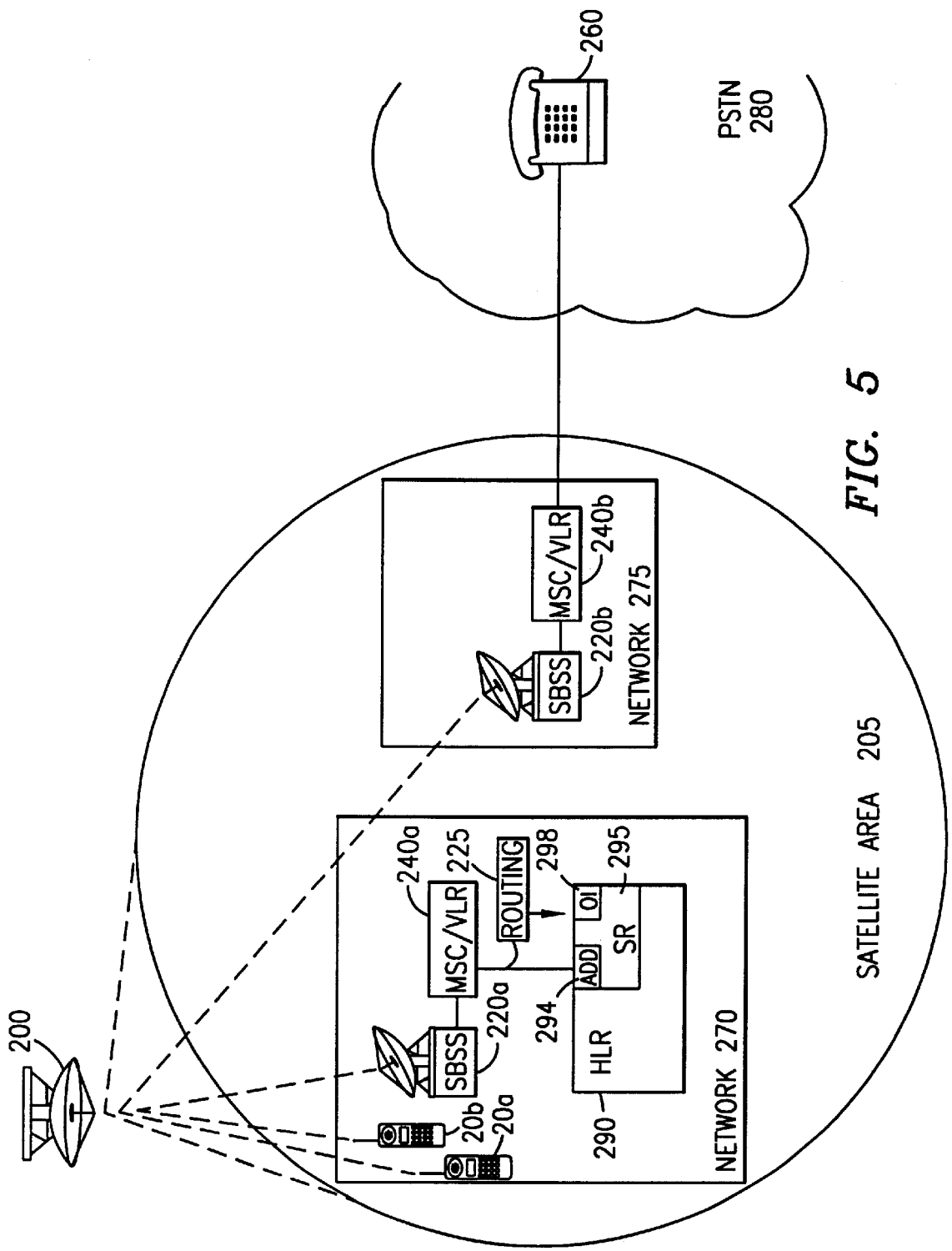
FIG. 5 illustrates the storage of an optimization indication in a home location register associated with an optimized mobile station in accordance with preferred embodiments of the present invention.

With reference now to FIG. 5 of the drawings, in accordance with preferred embodiments of the present invention, when the MS 20a is re-registered with the optimal MSC/VLR 240b for the optimized PSTN call, the HLR 290 associated with the MS 20a stores an address 294 for the optimal MSC/VLR 240b in a subscriber record 295 associated with the MS 20a along with an optimization indication 298 that the MS 20a has been re-registered to a remote optimal MSC/VLR 240b.

Thereafter, when a calling party, shown in FIG. 5 as a calling MS 20b, places a call to the optimized MS 20, the MSC/VLR 240a serving the calling MS 20b, which, in this case, is also a Gateway MSC/VLR 240a, but is referred to as MSC/VLR 240a, sends a routing request 225 to the HLR 290 for routing information for the called MS 20a. The HLR 290 accesses the subscriber record 295 associated with the called MS 20a and determines that the called MS 20a has been re-registered to the remote optimal MSC/VLR 240a based upon the optimization indication 298 stored in the subscriber record 295.

Figure 6:
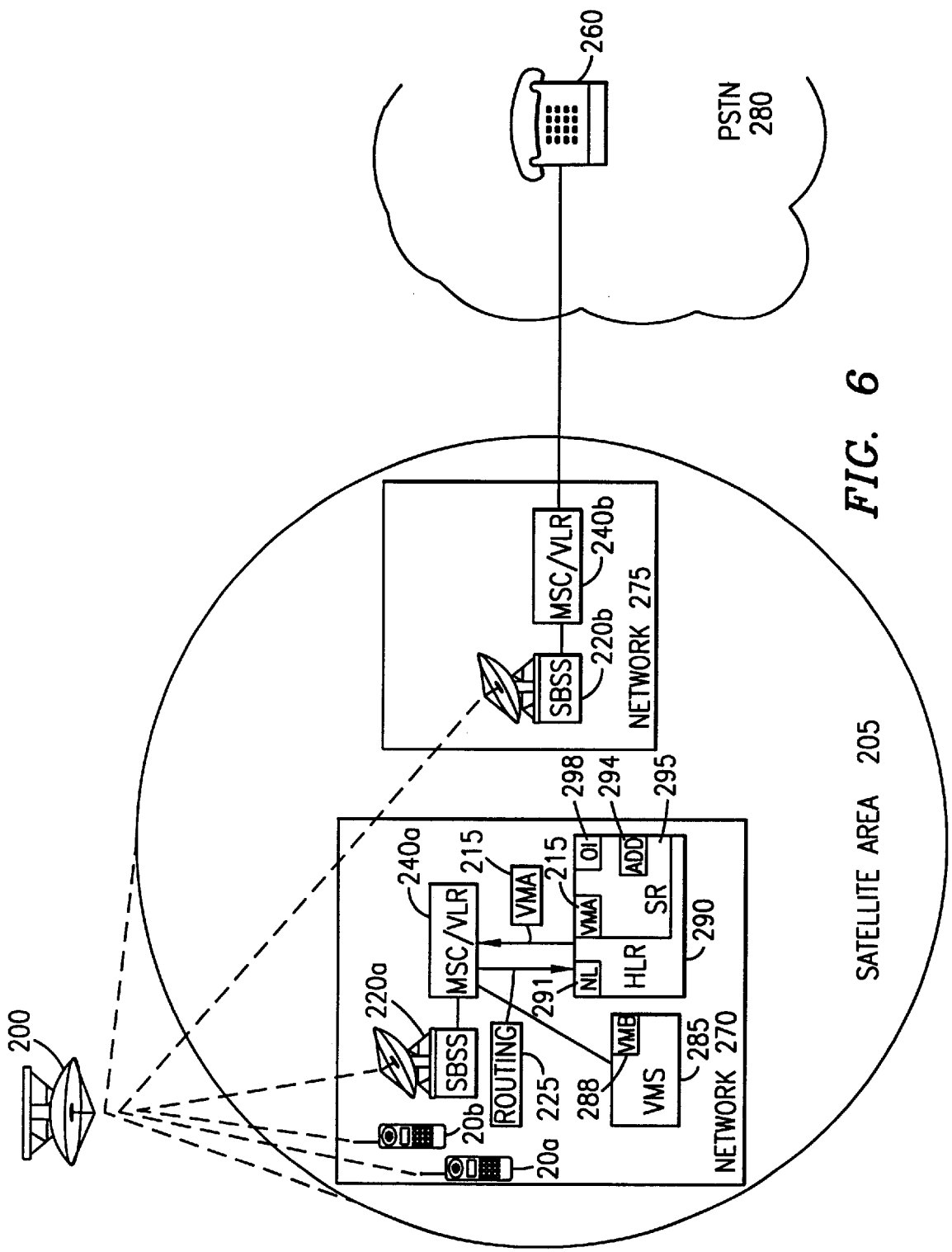
FIG. 6 illustrates one alternative to sub-optimal routing of incoming calls to an optimized mobile station in accordance with embodiments of the present invention.

In one embodiment of the present invention, with reference now to FIG. 6 of the drawings, in order to prevent sub-optimal routing of the new incoming call, the new incoming call can be forwarded to a local voice mail box 288 of a local voice mail system 285 associated with the called MS 20a. The HLR 290 can access the subscriber record 295, which stores routing information 215 for the voice mail box 288 of the called MS 20a, and provide this routing information 215 to the requesting MSC/VLR 240a. Thereafter, the MSC/VLR 240a can forward the incoming call to the called MS's 20a voice mail box 288 using the routing information 215.

In preferred embodiments, when the optimized call is completed and the called MS 20a is re-registered back with the original MSC/VLR 240a, the called MS 20a will receive notification that an incoming call was received during the optimized call. For example, if the calling party leaves a voice mail message, the called MS 20a can receive notification from the voice mail system 285 that a voice mail message was received and stored in the voice mail box 288. The called MS 20a can then access the voice mail box 288 and retrieve the voice mail message, as is understood in the art. Alternatively, if no voice mail message has been left, the called MS 20a can receive notification from notification logic 291 within the HLR 290 that an incoming call was received, and preferably, if the called MS 20a subscribes to a caller ID service, the B-number of the calling party can be provided to the called MS 20a.

Figure 7:
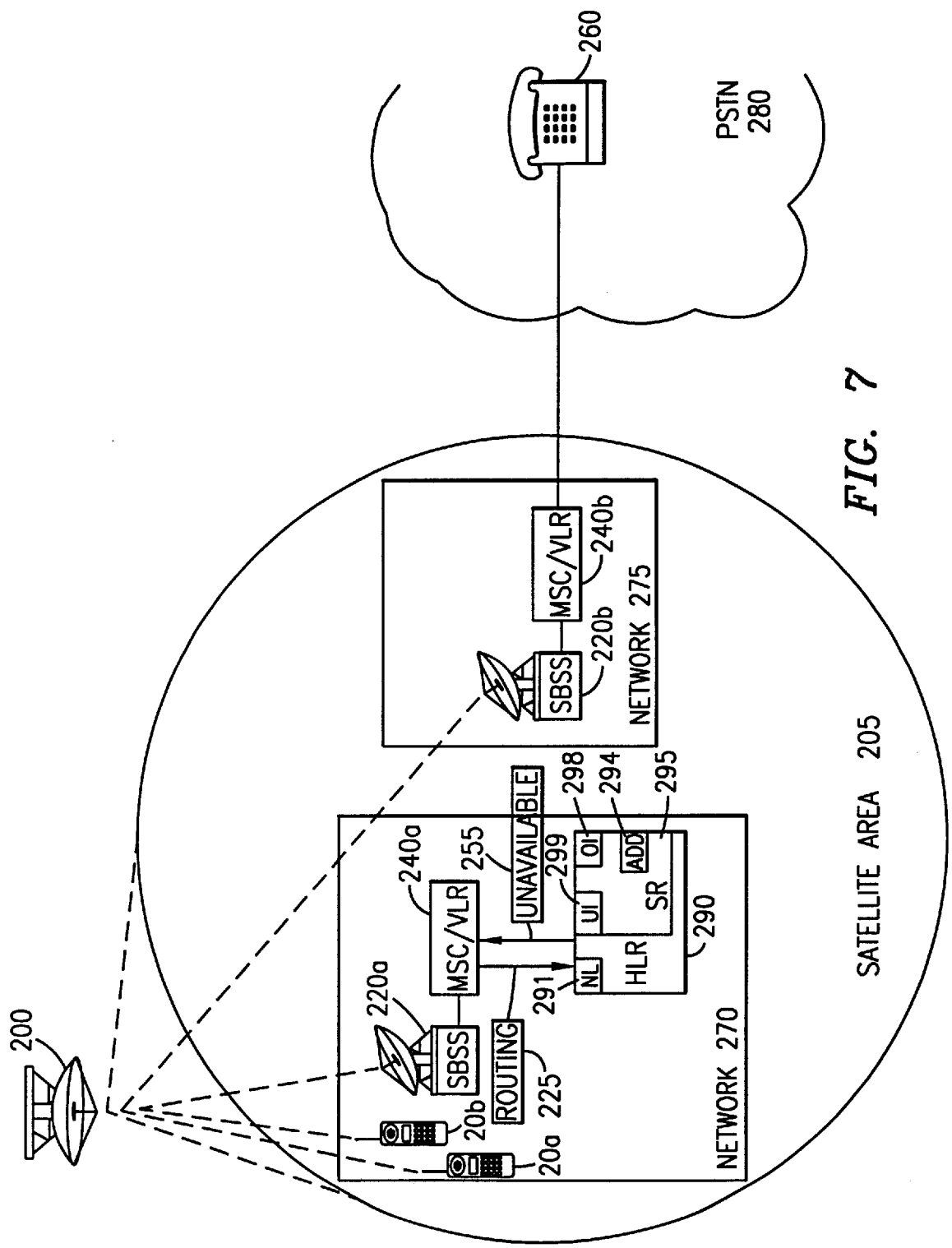
FIG. 7 illustrates another alternative to sub-optimal routing of incoming calls to an optimized mobile station in accordance with embodiments of the present invention.

In an alternative embodiment of the present invention, with reference now to FIG. 7 of the drawings, in order to prevent sub-optimal routing of the new incoming call, when the HLR 290 stores the optimization indication 298 in the subscriber record 295 associated with the optimized MS 20a, the HLR 290 can also store an unavailable indication 299. Therefore, when the HLR 290 receives the routing request 225 from the MSC/VLR 240a serving the calling MS 20b and determines that the called MS 20a has been re-registered at the remote optimal MSC/VLR 240b based upon the optimization indication 298, the HLR 290 can also determine that the called MS 20a is not reachable based upon the unavailable indication 299. In this situation, the HLR 290 will return an unavailable message 255 triggering the MSC/VLR 240a to provide an indication to the calling MS 20b that the called MS 20a is not reachable, such as a busy signal. As soon as the called MS 20a is registered back at the local MSC/VLR 240a, the called MS 20a will preferably be notified by the notification logic 291 within the HLR 290 about the incoming calls received during the optimized call, e.g., the B-numbers of the calling party's can be transmitted from the HLR 290 to the called MS 20a.

Figure 8:
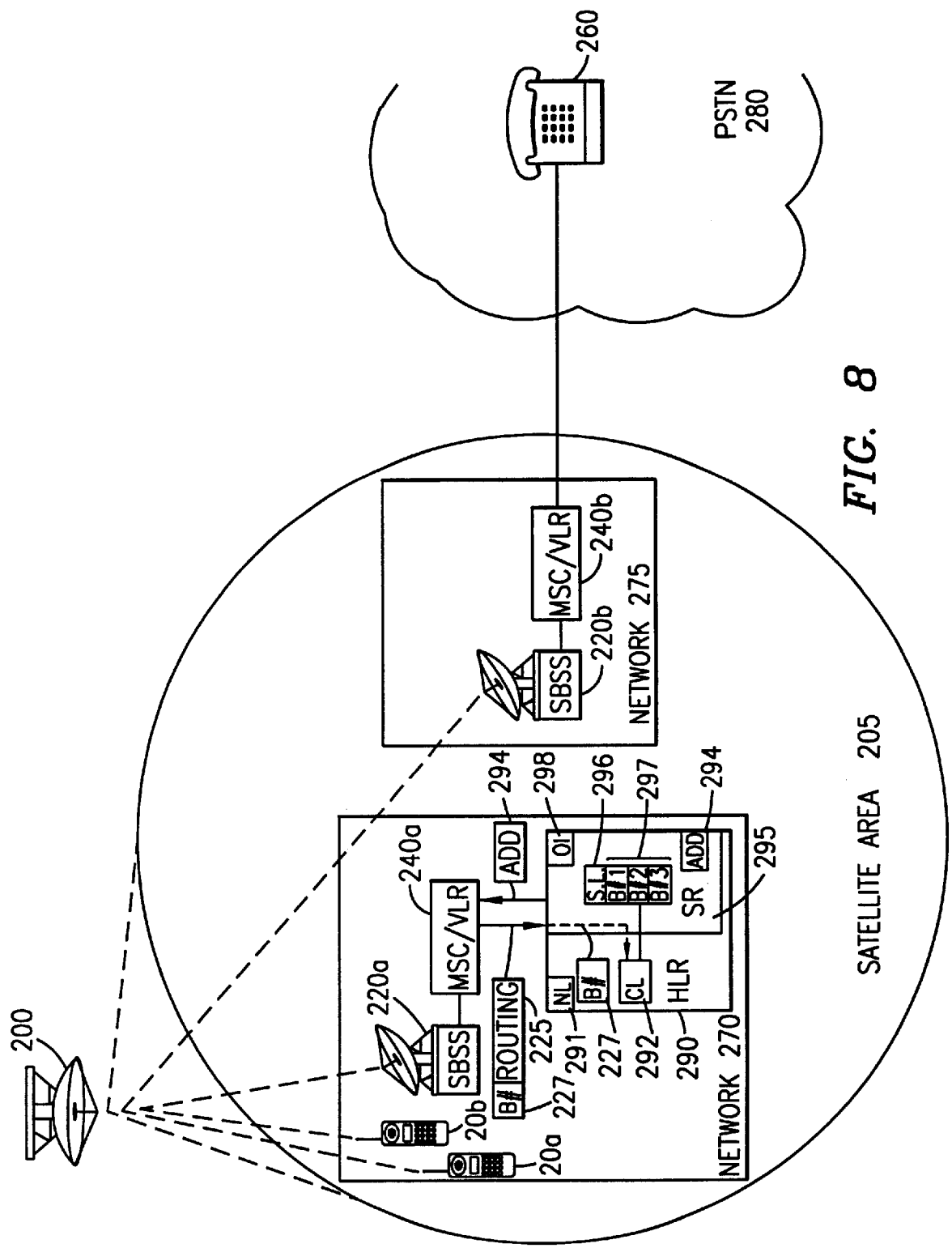
FIG. 8 illustrates a screening list of calling party's that are allowed to proceed with calls to an optimized mobile station even though sub-optimal routing may occur in accordance with embodiments of the present invention.

In a further alternative embodiment, with reference now to FIG. 8 of the drawings, the mobile subscriber associated with the called MS 20a can store a screening list 296 within the called MS subscriber record 295 within the HLR 290 to select which incoming calls should be allowed to proceed when the called MS 20a is optimized even if higher charges are applied. The screening list 296 contains a list of B-numbers 297 associated with the calling party's that are allowed to be connected to the called MS 20a when the called MS 20a has been re-registered to an optimal MSC/VLR 240b.

Thus, when a routing request 225 is received by the HLR 290 pursuant to an incoming call to the called MS 20a, the HLR 290 first determines that the called MS 20a has been re-registered to the optimal MSC/VLR 240b based upon the optimization indication 298. Thereafter, if the subscriber record 295 associated with the called MS 20a has a screening list 296 stored therein, comparison logic 292 within the HLR 290 compares a B-number 227 of the calling MS 20b, which is sent to the HLR 290 in the routing request 225 from the MSC/VLR 240a serving the calling MS 20b, with the list of B-numbers 297 within the screening list 296. If the B-number 227 of the calling MS 20b matches any one of the B-numbers 297 within the screening list 296, the HLR 290 returns routing information for the optimal MSC/VLR 240b, e.g., the address 294 for the optimal MSC/VLR 240b, to the requesting MSC/VLR 240a.

The requesting MSC/VLR 240a can attempt to complete the call to the called MS 20 by routing the call to the optimal MSC/VLR 240*b* using the address 294 for the optimal MSC/VLR 240*b* provided by the HLR 290. However, if the B-number 227 of the calling MS 20*b* does not match any one of the B-numbers 297 within the screening list 296, the HLR 290 proceeds with one of the alternatives discussed above and shown in FIGS. 6 and 7.

Figure 9:
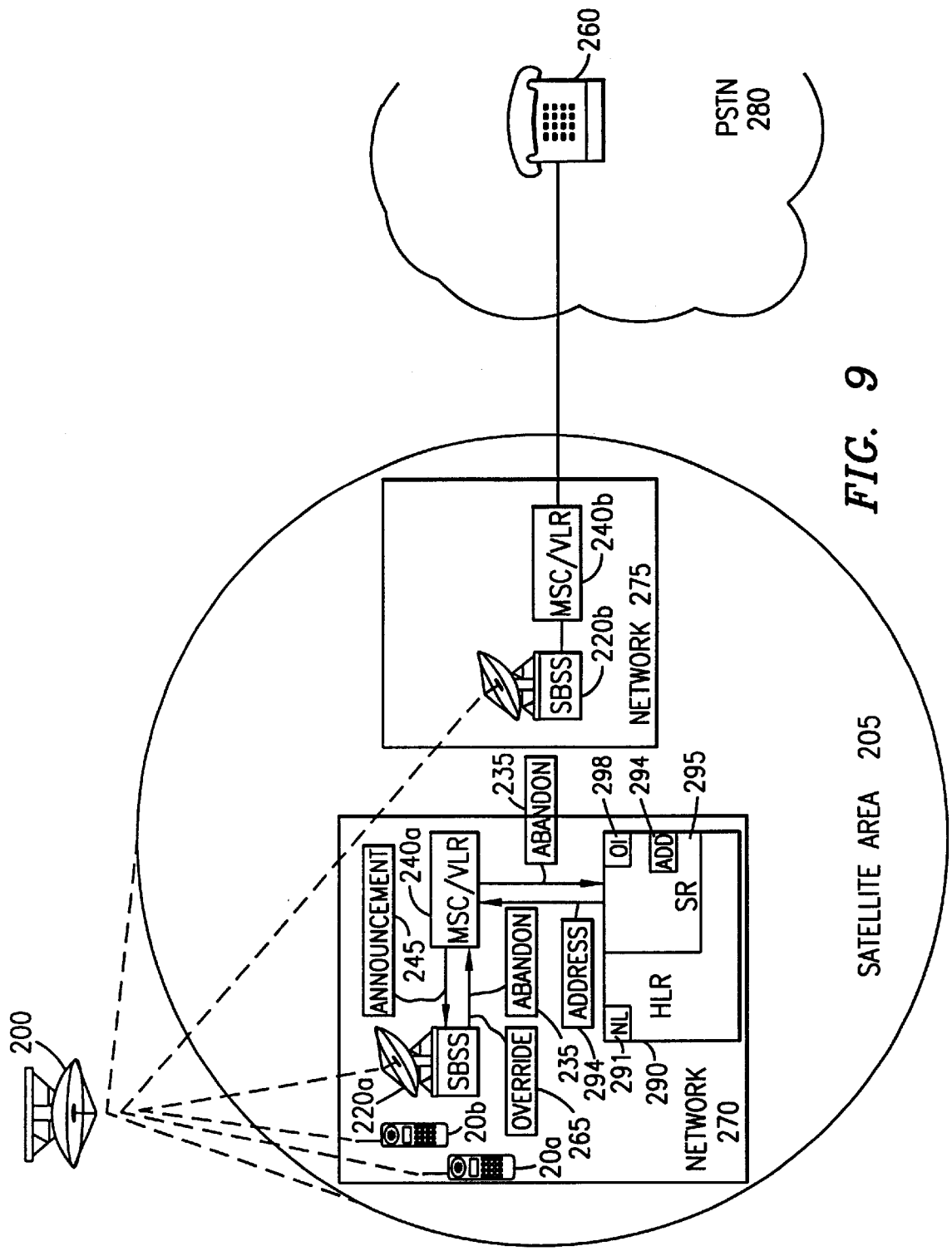
FIG. 9 illustrates an announcement allowing a calling party to decide whether or not to proceed with a call to an optimized mobile station even though sub-optimal routing may occur in accordance with embodiments of the present invention.

Alternatively, as shown in FIG. 9 of the drawings, while providing the address 294 for the optimal MSC/VLR 240*b* to the requesting MSC/VLR 240*a*, the HLR 290 can order the playing of a special announcement 245 by the MSC/VLR 240*a* to the calling MS 20*b* indicating that additional charges may apply. The calling MS 20*b* may override the announcement 245 and proceed with the call setup understanding that additional charges may apply to either the calling MS 20*b* or called MS 20*a* or abandon the call.

If the calling MS 20*b* sends an override message 265 back to the MSC/VLR 240*a*, e.g., by depressing a certain key on the MS 20*b* or verbally overriding the announcement 245, the call setup will continue from the MSC/VLR 240*a* to the optimal MSC/VLR 240*b*. However, if the calling MS 20*b* sends an abandon message 235 back to the MSC/VLR 240*a*, which can forward the abandon message 235 to the HLR 290, the HLR 290 can proceed with one of the alternatives discussed above and shown in FIGS. 6 and 7. It should be noted that the announcement 245 can alternatively be provided only when the B-number 227 associated with the calling MS 20*b* matches any one of the B-numbers 297 within the screening list 296 shown in FIG. 8 of the drawings.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A home location register for handling an incoming call to an optimized mobile station within a satellite network, said satellite network having a satellite covering a satellite coverage area, said satellite coverage area having a plurality of mobile switching centers therein, each of said mobile switching centers serving a specific mobile switching center area covering only a portion of said satellite area, said home location register comprising:

a memory for storing an optimization indication associated with said optimized mobile station, said optimization indication indicating that said mobile station is registered with an optimal mobile switching center for an optimized call when said optimization indication is set, said optimized mobile station being located within said satellite coverage area, but outside of said mobile switching center area served by said optimal mobile switching center, said memory further storing an unavailable indication associated with said optimized mobile station, said unavailable indication being set when said optimization indication is set;

means for receiving a routing request associated with said incoming call; and means for selectively providing either routing information in response to said routing request or an unavailable message when said unavailable indication is set.

2. The home location register of claim 1, wherein said means for selectively providing routing information further provides routing information for a voice mail box associated with said optimized mobile station within a voice mail system when said optimization indication is set.

3. The home location register of claim 1, wherein said memory is a subscriber record associated with said optimized mobile station, said unavailable indication being stored within said subscriber record.

4. The home location register of claim 1, further comprising:

notification logic for notifying said optimized mobile station that said incoming call was received when said optimization indication is no longer set.

5. The home location register of claim 1, further comprising:

a screening list associated with said optimized mobile station containing at least one stored B-number; and comparison logic for comparing a received B-number within said routing request with said at least one stored B-number within said screening list when said optimization indication is set, and for instructing said home location register to provide routing information for said optimal mobile switching center when said received B-number matches any one of said at least one stored B-number within said screening list.

6. The home location register of claim 5, wherein said means for selectively providing routing information further provides routing information for a voice mail box associated with said optimized mobile station within a voice mail system when said optimization indication is set and said received B-number does not match any one of said at least one B-number within said screening list.

7. The home location register of claim 5, further comprising:

an unavailable indication associated with said optimized mobile station, said unavailable indication being set when said optimization indication is set, said home location register providing an unavailable message when said unavailable indication is set and said received B-number does not match any one of said at least one B-number within said screening list.

8. A method for handling an incoming call to an optimized mobile station within a satellite network, said satellite network having a satellite covering a satellite coverage area, said satellite coverage area having a plurality of mobile switching centers therein, each of said mobile switching centers serving a specific mobile switching center area covering only a portion of said satellite area, said method comprising the steps of:

setting, by a home location register, an optimization indication associated with said optimized mobile station when said optimized mobile station is registered with an optimal mobile switching center for an optimized call, said optimized mobile station being located within said satellite coverage area, but outside of said mobile switching center area served by said optimal mobile switching center;

setting, by said home location register, an unavailable indication associated with said optimized mobile station when said optimization indication is set;

receiving, by said home location register, a routing request associated with said incoming call to said optimized mobile station; and selectively providing, by said home location register, either routing information or an unavailable message when said unavailable indication is set to a source of said incoming call.

9. The method of claim 8, wherein said step of selectively providing further comprises the step of:

providing, by said home location register, routing information for a voice mail box associated with said optimized mobile station within a voice mail system.

10. The method of claim 8, further comprising the steps of:
   removing said optimization indication when said optimized mobile station is no longer registered with said optimal mobile switching center; and
   notifying said optimized mobile station that said incoming call was received when said optimization indication is no longer set.

11. The method of claim 8, wherein said step of selectively providing further comprises the steps of:
   comparing a received B-number within said routing request with at least one stored B-number within a screening list associated with said optimized mobile station and stored within said home location register when said optimization indication is set; and
   providing, by said home location register, routing information for said optimal mobile switching center when said received B-number matches any one of said at least one stored B-number within said screening list.

12. The method of claim 11, wherein said step of selectively providing further comprises the step of:
   providing, by said home location register, routing information for a voice mail box associated with said optimized mobile station within a voice mail system when said optimization indication is set and said received B-number does not match any one of said at least one stored B-number within said screening list.

13. The method of claim 11, wherein said step of selectively providing further comprises the steps of:
   setting an unavailable indication associated with said optimized mobile station within said home location register when said optimization indication is set; and
   providing, by said home location register, an unavailable message when said unavailable indication is set and said received B-number does not match any one of said at least one stored B-number within said screening list.

14. The method of claim 8, wherein said step of selectively providing further comprises the step of:
   providing, by said home location register, routing information for said optimal mobile switching center; and
   triggering, by said home location register the providing of an announcement indicating that said optimized mobile station is registered with said optimal mobile switching center when said optimization indication is set.

15. The method of claim 14, wherein said step of selectively providing further comprises the steps of:
   receiving, in response to said announcement, an override message; and
   connecting said incoming call to said optimal mobile switching center.

16. The method of claim 14, wherein said step of selectively providing further comprises the step of:
   receiving, by said home location register, in response to said announcement, an abandon message; and
   providing, by said home location register, routing information for a voice mail box associated with said optimized mobile station within a voice mail system when said optimization indication is set.

17. The method of claim 14, wherein said step of selectively providing further comprises the steps of:
   receiving, by said home location register, in response to said announcement, an abandon message;
   setting an unavailable indication associated with said optimized mobile station within said home location register when said optimization indication is set; and
   providing, by said home location register, an unavailable message when said unavailable indication is set.

* * * * *